United States Patent

Romerhaus

[15] 3,639,083
[45] Feb. 1, 1972

[54] VALVE MEANS FOR COMPRESSORS AND THE LIKE

[72] Inventor: Bert W. Romerhaus, Haubstadt, Ind.
[73] Assignee: Whirlpool Corporation
[22] Filed: Apr. 6, 1970
[21] Appl. No.: 25,799

[52] U.S. Cl..............................................417/282, 137/468
[51] Int. Cl..........................................................F04b 49/00
[58] Field of Search................417/282, 292, 299; 137/468; 236/93, 101

[56] References Cited

UNITED STATES PATENTS

| | | | |
|---|---|---|---|
| 1,864,787 | 1/1932 | Williams | 236/93 |
| 3,137,339 | 6/1964 | Kading | 236/93 |
| 3,137,777 | 6/1964 | Yeckley et al. | 236/93 |
| 2,410,522 | 11/1946 | Powell | 417/292 |
| 3,348,764 | 10/1967 | Romerhaus | 417/299 |
| 3,313,530 | 4/1967 | Bickhaus et al. | 417/492 |

FOREIGN PATENTS OR APPLICATIONS 687,281  11/1953  Great Britain..........................236/101

*Primary Examiner*—William L. Freeh
*Attorney*—James S. Nettleton, Thomas E. Turcotte, Burton H. Baker, Gene A. Heth, Franklin C. Harter, Anthony Niewyk, Robert L. Judd and Hofgren, Wegner, Allen, Stellman & McCord

[57] ABSTRACT

A valve having means for adjusting the movable member relative to the valve seat as a function of the temperature causing the movable member to be more closely spaced to the valve seat at low temperatures. The valve is adapted for use in a compressor for controlling a pressure equalizing passage permitting the mass flow of the compressible fluid to more easily close the passage at low-ambient temperatures whereat the density of the fluid is relatively low.

6 Claims, 5 Drawing Figures

PATENTED FEB 1 1972
3,639,083
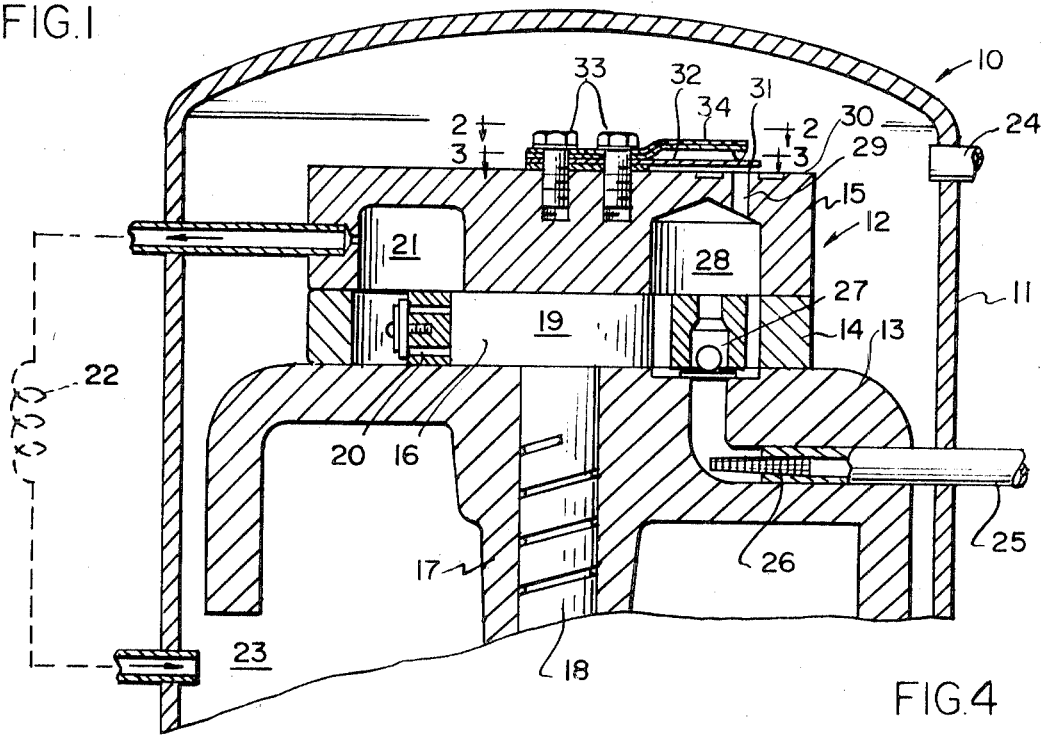
FIG.1
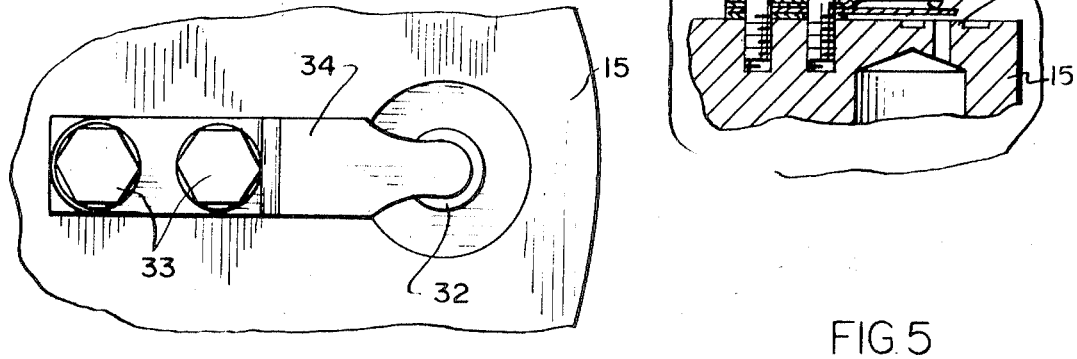
FIG.2
FIG.3
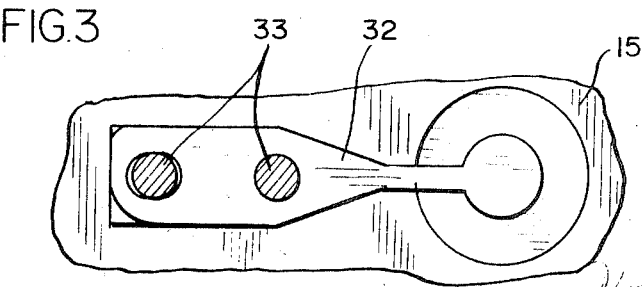
FIG.4
FIG.5
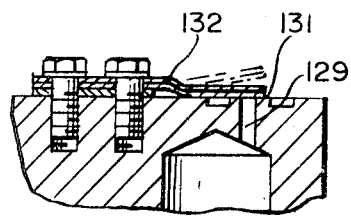
INVENTOR
BERT W. ROMERHAUS
BY *Horgren, Wegner, Allen, Stellman & McCord*
ATTORNEYS.

VALVE MEANS FOR COMPRESSORS AND THE LIKE

CROSS-REFERENCE TO RELATED APPLICATIONS

In my copending application Ser. No. 814,908 for a Pressure Equalizing Means for Compressors and the Like, a valve responsive to the mass flow of refrigerant fluid to control a pressure equalizing bypass passage is shown and claimed. Reference may be had to said application for a detailed description of the compressor and pressure equalizing means.

BACKGROUND OF THE INVENTION

1. Field of the Invention

This invention relates to valve means and in particular to valve means such as for use in compressors and the like.

2. Description of the Prior Art

In my above identified copending application, the means for equalizing the pressure between the suction and high-pressure chambers of a compressor is defined by a bypass passage providing direct communication therebetween and a valve member for selectively closing the passage as a result of the mass flow of the refrigerant vapor flowing past the valve member into the passage. This structure provides an improved pressure equalizing function permitting facilitated startup of the compressor by preventing relatively high pressure differentials between the discharge and suction sides of the compressor at startup time.

In certain installations, the compressor may be subjected to relatively low ambient temperatures. Under such conditions, the refrigerant vapor has a relatively low density and, thus, has a relatively low mass flow value. The temperature may be sufficiently low so that an appreciable time is necessary to build up mass flow to effect the closing of the valve for normal compressor operation. An increase in mass flow occurs due to heating of the refrigerant during the initial operation while in the bypassing arrangement. However, it has been found that under extremely low temperature conditions, an undesirably long period of compressor operation my be required to raise the mass flow rate of refrigerant sufficiently to effect valve closing and the termination of the bypassing operation.

SUMMARY OF THE INVENTION

The present invention comprehends an improved valve structure for use in such applications which eliminates this problem in a novel and simple manner.

More specifically, the present invention comprehends an improved valve including means defining a valve seat and fluid flow passage opening through the valve seat, a movable valve member adjacent the valve seat for selectively seating across the seat to close the passage, and means for positioning the valve member at a variable spacing from the valve seat as a function of the temperature thereof permitting the valve member to be more closely spaced to the valve seat at lower temperatures and further spaced therefrom at higher temperatures.

The valve is adapted for use in a compressor having a bypass passage between the suction and high pressure chambers whereby the valve may control the equalizing of the pressure in the suction and high pressure chambers during startup of the compressor. The valve may be responsive to the mass flow of fluid from the high-pressure chamber into the bypass passage for seating the valve. Thus, the valve may be closed by a relatively low mass flow under cold temperature conditions as a result of the positioning of the valve member closely adjacent the valve seat. Where the ambient temperature is relatively high, the positioning member spaces the valve member further from the valve seat and, thus, a greater mass flow is required to effect the seating of the valve member. Resultingly, a relatively uniform startup time is provided notwithstanding a wide range of ambient temperature conditions.

BRIEF DESCRIPTION OF THE DRAWING

Other features and advantages of the invention will be apparent from the following description taken in connection with the accompanying drawings wherein:

FIG. 1 is a fragmentary vertical section of a compressor having a pressure equalizing means utilizing a valve embodying the invention;

FIG. 2 is a fragmentary enlarged horizontal section taken substantially along the line 2—2 of FIG. 1;

FIG. 3 is a fragmentary enlarged horizontal section taken substantially along the line 3—3 of FIG. 1;

FIG. 4 is a fragmentary vertical section illustrating the closed arrangement of the reed valve; and FIG. 5 is a fragmentary vertical section of a modified form of valve embodying the invention in the closed arrangement.

DESCRIPTION OF THE PREFERRED EMBODIMENTS

In the exemplary embodiment of the invention as disclosed in FIGS. 1–4 of the drawing, a motor compressor generally designated 10 is shown to comprise a housing 11, a compressor 12 including a front head 13, a cylinder 14, a rear head 15, and a rotor 16. Front head 13 defines a hub 17 forming a bearing for a motor shaft 18 arranged to be rotated by a conventional electric motor (not shown). Front head 13, rear head 15, and cylinder 14 cooperate to define a compression chamber 19 in which rotor 16 rotatably compresses a fluid such as a refrigerant fluid. The compressed fluid is discharged through outlet parts 20 to a discharge chamber 21 leading to a precooler 22, and returning to the housing 11 into a high pressure chamber 23 thereof. From high-pressure chamber 23, the precooled compressed fluid is delivered to the associated refrigeration apparatus (not shown) through an outlet duct 24. The refrigerant fluid is returned to the compressor through a return duct 25 which may be provided with a filter screen 26 and a check valve 27 to a suction chamber 28 communicating with the compression chamber 19.

Pressure is equalized between high-pressure chamber 23 and suction chamber 28 during startup of the compressor by means of a bypass passage 29 in rear head 15 communicating between high pressure chamber 23 and suction chamber 28. The passage opens through an upper surface 30 of the rear head to define a valve seat 31 at the upper end of the passage. Flow of refrigerant fluid through the passage is controlled by a reed valve 32 which is secured to the rear head 15 by suitable means such as bolts 33. The reed valve is responsive to the mass flow of the refrigerant fluid to be urged toward the valve seat 31 as the refrigerant fluid flows past the reed valve into the bypass passage 29 as when the motor compressor is started up. When the reed valve 32 seats on valve seat 31, it effectively closes the passage and normal operation of the compressor is initiated wherein the compressed fluid is returned to the suction chamber 28 by way of outlet duct 24 in the refrigeration apparatus and return duct 25. The mass flow necessary to effect the closing of passage 29 may be varied by suitably selecting the size and flexibility of the reed valve 32, the size of the flow passage 29, and the proximity of the reed valve member 32 to the valve seat 31 at the time of startup.

The present invention comprehends an improvement in such a valve structure whereby the spacing of the valve member relative to the valve seat is caused to vary as a direct function of the ambient temperature. For this purpose, a deflector 34 is provided adjacent the valve member and similarly secured to the rear head 15 by bolts 33. Deflector 34 herein comprises a thermally responsive member adapted to deflect toward the valve seat at low temperatures and be positioned away from the valve seat at high temperatures. Thus, as seen in full lines in FIG. 4, the deflector 34 may be biased toward the valve seat 31 sufficiently to dispose the valve member 32 closely adjacent the valve seat where the temperature is relatively low such as Zero degrees F. Under such low ambient temperature conditions, the refrigerant vapor may have a low density and a low pressure such as approximately 10 p.s.i.g. However, the close spacing of the valve member to the valve seat permits the vapor to quickly effect the seating of the valve member on the valve seat notwithstanding the relatively low mass flow thereof due to the low density of the vapor. Alternatively, when the temperature is relatively high, the deflector 34 permits the valve member to move to a rectilinear configuration as shown in FIG. 1, thereby requiring a greater mass flow of the refrigerant vapor to effect the closing of the valve as a result of the greater movement of the valve necessary to effect a seating thereof on valve seat 31. In either case, the mass flow of the fluid becomes sufficient to close the valve shortly after the motor starts.

Deflector 34 may illustratively comprise a bimetallic strip of well known construction utilizing juxtaposed elements of metals having different coefficients of thermal expansion. The valve member 32 may comprise a conventional spring steel valve element.

Referring to FIG. 5, a modified form of valve structure embodying the invention is shown to comprise structure similar to that of FIG. 1 but wherein the valve member 132 is formed as a bimetallic member which not only deflects as a function of the mass flow of the refrigerant therepast into the passage 129 but also selectively positions itself in spaced association with the valve seat 131 as a function of the temperature. The valve structure of FIG. 5 is similar to that of FIG. 1 except that the function of the deflector 34 is incorporated integrally in the valve member 132. Thus, the compressor operation utilizing valve member 132 is similar to that of compressor 10 utilizing deflector 34 and valve member 32. With either construction, i.e., of FIGS. 1-4 or FIG. 5, once the valve member seats on the valve seat, the pressure differential existing between the low-pressure fluid in the suction chamber 28 and the high-pressure fluid in chamber 23 maintains the valve in the closed position. Upon termination of the compressor operation, the pressures in chambers 23 and 28 quickly equalizes the valve returns to its normal position reopening the bypass passage.

Upon restarting of the motor compressor, the position of deflector 34 or valve member 132 is determined by the amount of heat remaining in the system at that time. Thus, if the motor compressor is started immediately upon termination of a previous operation, the relatively high temperature of the system will cause the deflector 34 or valve member 132 to be spaced substantially from the valve seat thus requiring a maximum mass flow of the refrigerant to effect the valve closing. Where the ambient temperature is low and the system has cooled down subsequent to termination of the prior operation, the deflector 34 or valve member 132 will be suitably repositioned for facilitated closing upon restarting of the motor compressor notwithstanding a decrease in the density of the refrigerant fluid. Thus, the motor compressor may be started with relatively low torque requirements such as approximately 8 ounce feet under widely varying conditions. Similarly, the pressure equalized startup time is effectively uniform notwithstanding operation of the motor compressor under widely varying ambient temperature conditions.

The foregoing disclosure of specific embodiments is illustrative of the broad inventive concepts comprehended by the invention.

The embodiments of the invention in which an exclusive property or privilege is claimed are defined as follows:

1. In a compressor having means defining compression, suction and high-pressure chambers, means for pumping fluid at high pressure from said compression chamber to said high-pressure chamber, and means defining a bypass passage providing direct communication between said suction and high-pressure chambers, flow control means for equalizing the pressure in said suction and high pressure chambers during startup of the compressor, said flow control means including means responsive to temperature and to the mass flow of fluid from said high-pressure chamber through said bypass passage to said suction chamber for closing said passage after a short startup operation of the compressor, said flow control means defining means adjusting the disposition of said means for closing the bypass passage to permit the fluid flow to more readily cause closing of said bypass passage at low temperatures.

2. The compressor means of claim 1 wherein said flow control means comprises a thermally deflectible reed valve.

3. The compressor means of claim 1 wherein said flow control means comprises a bimetallic means.

4. The compressor means of claim 1 wherein said flow control means comprises a valve member movable adjacent said passage and thermally responsive means for adjustably positioning the valve member as a function of the temperature thereof.

5. The compressor means of claim 1 wherein said flow control means comprises a valve member movable adjacent said passage and a thermally responsive element adjacent the valve member for adjustably positioning the valve member as a function of the temperature thereof.

6. The compressor means of claim 1 wherein said flow control means comprises a valve member movable adjacent said passage and a bimetallic deflector adjacent the valve member for adjustably positioning the valve member as a function of the temperature thereof.

* * * * *